United States Patent
O'Brien et al.

[15] 3,683,702
[45] Aug. 15, 1972

[54] SAMPLER FOR FRUITS OR VEGETABLES IN BULK AND METHOD OF SAMPLING FRUITS OR VEGETABLES IN BULK

[72] Inventors: Michael O'Brien; Wilson B. Goddard; Rodney B. Williams, all of Davis, Calif.

[73] Assignee: The Regents of the University of California

[22] Filed: April 5, 1971

[21] Appl. No.: 131,184

[52] U.S. Cl. ............................................... 73/423 R
[51] Int. Cl. ................................................. G01n 1/08
[58] Field of Search...73/421 R, 421 B, 423 R, 425.2

[56] References Cited

UNITED STATES PATENTS 3,158,030  11/1964  Cross ........................ 73/423 R

FOREIGN PATENTS OR APPLICATIONS 1,265,544  5/1961  France ...................... 73/423 R
  142,477  11/1961  U.S.S.R. .................... 73/423 R

*Primary Examiner*—S. Clement Swisher
*Attorney*—Lothrop & West

[57] ABSTRACT

A sampler for a bulk body of fruits or vegetables includes a cylindrical tube arranged on a vertical axis and movable vertically down into the bulk body. The open, lower end of the tube has a cutting edge. Within the tube are gates movable to block the lower end. Arranged beneath the tube is a separator including an annular or conical member having a central opening smaller in diameter than the tube and having a periphery larger in diameter than the tube. The method involves plunging the tube into the bulk body of fruits or vegetables, the cutting edge severing a column of material. The gates are then closed and the tube and contained column are lifted out of the bulk body. The column contains many whole specimens and some cut specimens. The tube is then poised in axial alignment over the separator and the gates are opened. The falling material is separated by the separator into two parts, the cut specimens, on the outer periphery, falling onto and around the outer part of the separator to discard whereas the whole specimens, in a center core, pass through the central opening in the separator and preferably are caught in a receptacle. Only the material passing through the central opening is utilized as a sample.

15 Claims, 4 Drawing Figures

Patented Aug. 15, 1972

MICHAEL O'BRIEN
WILSON B. GODDARD
RODNEY B. WILLIAMS
INVENTORS.

BY Lothrop & West

ATTORNEYS

Patented Aug. 15, 1972

MICHAEL O'BRIEN
WILSON B. GODDARD
RODNEY B. WILLIAMS
INVENTORS.

BY Lothrop & West
ATTORNEYS

SAMPLER FOR FRUITS OR VEGETABLES IN BULK AND METHOD OF SAMPLING FRUITS OR VEGETABLES IN BULK

There is an increasing necessity to be able to sample accurately, fairly and uniformly large masses of material such as produce. For example, fruit and vegetable harvests at present are increasingly being handled in large bulk; for example, several tons at a time in a truck load. Usually, acceptance and payment for the material is contingent upon the material quality. This necessitates sampling. It is important to have a quick, accurate and unbiased sampling method and appropriate means for carrying out the method.

It is therefore an object of the invention to provide a sampler and method of sampling which can easily be utilized in connection with massive loads of materials of various different kinds, particularly fruits and vegetables.

Another object of the invention is to provide a sampler which can be operated quickly and easily by semi-skilled labor, even under generally unfavorable operating conditions.

Another object of the invention is to provide a sampler and method of sampling which are not susceptible to tampering or misuse.

Another object of the invention is to provide a sampler and method of sampling which can economically and easily be fitted into customary operations.

A further object of the invention is in general to provide an improved sampler and method of sampling.

Other objects, together with the foregoing, are attained in the embodiment of the invention described in the accompanying description and illustrated in the accompanying drawings, in which.

In practice the present sampler has been utilized with various commodities, such as peaches and tomatoes. There are numerous comparable commodities that can accurately be sampled by our mechanism and method but since tomatoes afford a good bases for description, the present disclosure is of an embodiment used in the sampling of tomatoes.

Figure 1:
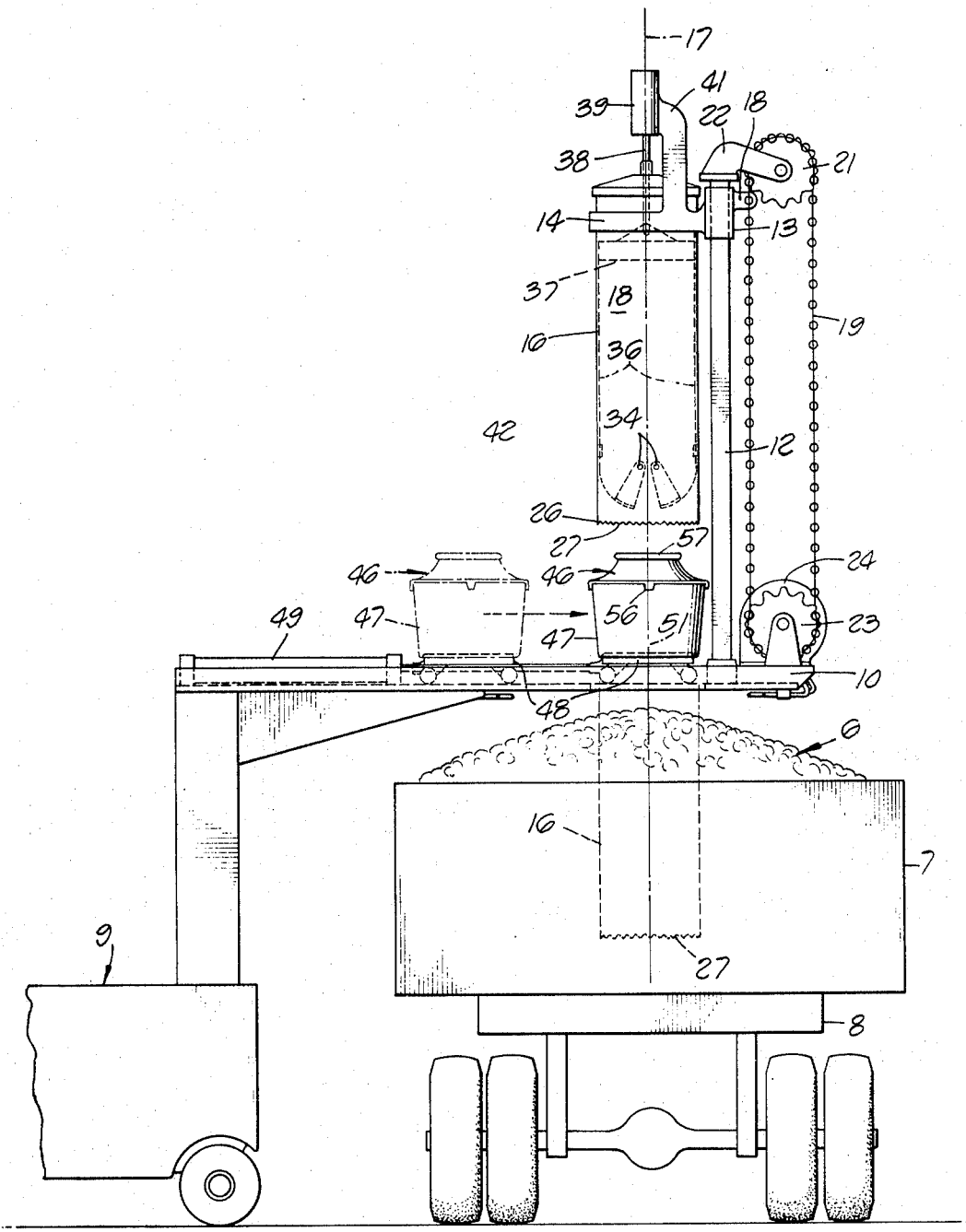
FIG 1 is an end elevation of a sampler, shown in somewhat diagrammatic form, in operation upon a truck load of produce, such for example as tomatoes.

As particularly shown in FIG. 1, it is now customary for a driver to arrive at a checking station with a bulk load 6 or body or mass of produce, such as tomatoes. These are tomatoes just as they are picked or harvested in the field and dumped at random into the carrying structure 7 of the truck 8. There may be several tons of tomatoes distributed fairly uniformly, about as illustrated, across the width of the truck body and along the length thereof. It is desired to sample several different areas of the load in order that various proper samples can be checked for quality of the adjacent produce.

In a representative installation there is provided a portable carrier 9, such as a forklift carrier, having an extended rail boom 10 thereon adapted to be maneuvered to extend over the load 6. Mounted on the boom 10 is an upright 12 carrying a slide 13. A hoop 14 projects from the slide and is engaged with a tube 16 in the form of a cylinder, preferably a circular cylinder, symmetrical about a generally vertical tube axis 17. In a representative case, the tube is approximately 42 inches in axial dimension and has a diameter of approximately 18 inches.

To move the tube up and down; that is, to translate it vertically along the axis 17, there is provided a tube moving means. The slide 13 has an extension 18 fastened to a chain 19 trained around an upper idler 21 on an appropriate frame 22. The chain 19 also is trained around a driving sprocket 23 coupled to a hydraulic motor 24 on the boom 10. When the hydraulic motor is operated in one direction, the chain 19 is moved so as to lift the slide 13, the hoop 14 and the tube 16 toward the uppermost position. When the motor is operated in the other direction the slide 13, hoop 14 and the tube 16 are lowered. Adjacent to or on its lower, leading end 26 the tube is either sharpened so that it has a cutting ability or is provided with serrations 27 for the same purpose.

Figure 2:
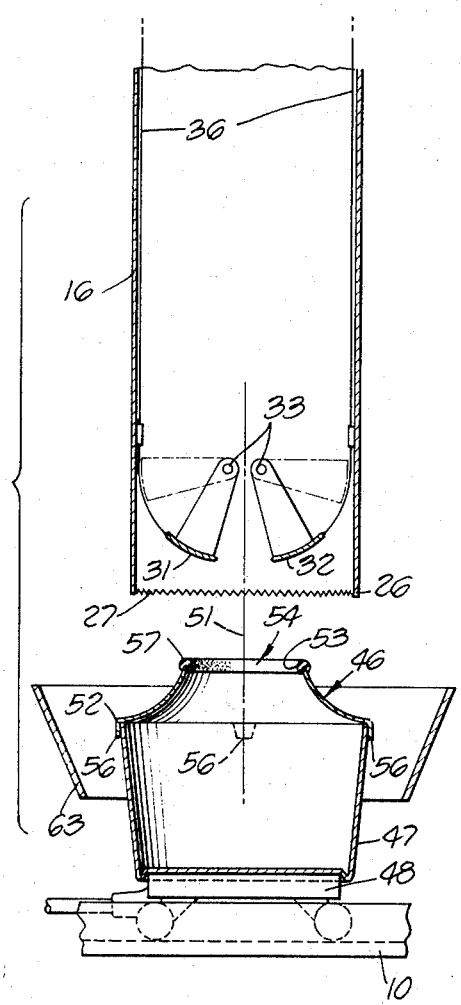
FIG. 2 is a cross section of the sampler shown in FIG. 1, certain portions of the mechanism being broken away to reduce the figure size.
Figure 3:
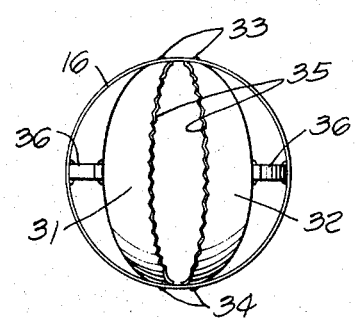
FIG. 3 is an end elevation of the sampling tube shown in FIG. 2.

As particularly shown in FIGS. 2 and 3, the tube 16 near its lower end 26 is provided with a pair of gates 31 and 32. Both gates are substantially the same so the description of one applies also to the other. Each gate is primarily a band of metal or of inert plastic shaped like a segment of a sphere. The band adjacent its opposite ends is connected by pivots 33 and 34 to the material of the tube 16 on a cross axis on or approximately parallel to a tube diameter. The dimensions of each gate are such that it can move into an open or non-obstructing position, as shown by the broken lines in FIG. 2, adjacent the sidewall of the tube or into a closed position, in which the gate is a small distance away from the tube center and tube wall. It is not necessary that the gates when closed come into exact abutment nor that there is no space between them and the surrounding tube. It is sufficient if the gates are of a size and occupy positions when closed to block egress from the tube. In a representative example the gates are about 3 inches in circumferential width and are moved from a position close to the tube wall until they approach each other within 4 1/2 inches 5 inches. Conveniently, the gates themselves along their adjacent edges are provided with serrations 35 or other sharpening means.

In order to move the gates between the described positions, each of them is connected by a strap 36, flexible at least in its lower portions, to a yoke 37 in the upper portion of the structure. The yoke is connected to a piston rod 38 joined to a hydraulically actuated piston mechanism 39, the cylinder portion of which is connected by a bracket 41 to the hoop frame 14. When the hydraulic mechanism 39 is actuated in the customary way, the gates 31 and 32 through the flexible straps 36 are moved from their open position toward their closed position and vice versa.

In the operation of this portion of the structure, the tube 16 and its accompanying frame are disposed over a selected one of several areas of the load 6 within the truck body 7. The motor 24 is energized to move the slide 13 downwardly along the upright 12 and thus the tube 16 is moved downwardly and begins to encounter the lading, such as tomatoes, in the truck body. The hydraulic cylinder 39 travels with the tube and is actuated to hold the gates 31 and 32 in open or non-blocking position. As the tube descends into the tomatoes the lower cutting edge thereof cuts into the lading thus demarking a vertical column of tomatoes. The tomatoes nearer the center of the tube are unaffected, although those which are encountered by the leading edge 26 are severed and cut. This destroys such fruit for some but not all uses. The amount of tomatoes cut or severed by this means is relatively small and in practice is so small that it is not an adverse factor.

The tube 16 is translated downwardly and stopped close to the bottom of the truck body 6 thus segregating a gross sample of the lading. If desired, a buffer or feeler can precede the tube end 26 to stall the motor 24 or turn it off upon contact with the bottom of the body of the truck 8. When the tube has been fully descended, the cylinder 39 is actuated and the gates 31 and 32 are then moved to their blocking or closed position, as shown in FIG. 2. Thereupon, the motor 24 is reversed and the chain 19 is effective to lift the slide 13 and to lift the closed tube 16 out of the lading and well above the platform boom 10 substantially into the position shown in FIG. 1. At this juncture the tube 16 is poised above the load. It is still on its vertical axis 17 and contains a column of tomatoes, many of which are intact and others of which are fragmentary and severed.

At this juncture there is disposed beneath the tube 16 a separator 46. The separator may be mounted to swing into and out of the position shown, but conveniently rests on a receptacle 47 of any suitable form temporarily lodged on a carriage 48 reciprocable on the booms 10 by means of a hydraulic structure 49. The carriage 48 can be moved between the full line position shown in FIG. 1 and the broken line position therein.

The separator 46 is primarily a member symmetrical about a separator axis 51, usually disposed vertically. The separator, when seen in plan, is an annulus centered on the axis 51. The annulus has an outer edge 52 larger in diameter than the diameter of the tube 16 and also has an inner edge 53 bounding a central opening 54, the inner edge 53 being of lesser diameter than that of the tube 16. When seen in side elevation, the separator is approximately a frustum of a cone disposed with its base downwardly. In the present case the separator is a figure of revolution which is conoidal since its sides are actually arcuate.

In one form, the separator 46 has a number of lugs 56 removably centering the separator on the container 47 or receptacle. When the separator is mounted to swing into and out of position, some or all of the lugs 56 are omitted. The container can be of any desired description. Around its inner edge the separator is preferably equipped with a cushion 57 or buffer of relatively soft, resilient material.

In the use of the structure and the practice of the method, when the tube 16 has been poised with a load in the position shown in FIG. 1, the carriage 48 moves the container 47 and the separator 46 into position so that the separator axis 51 substantially coincides with the axis 17 of the tube and with the upper end of the separator some 3 or 4 or 5 inches below the lower edge 26 of the tube. At this juncture the operator actuates the hydraulic mechanism 39 so that the gates 31 and 32 are moved from closed or blocking position to open position. This motion releases the previously bridged or impacted tomatoes so that they all fall downwardly by gravity.

Figure 4:
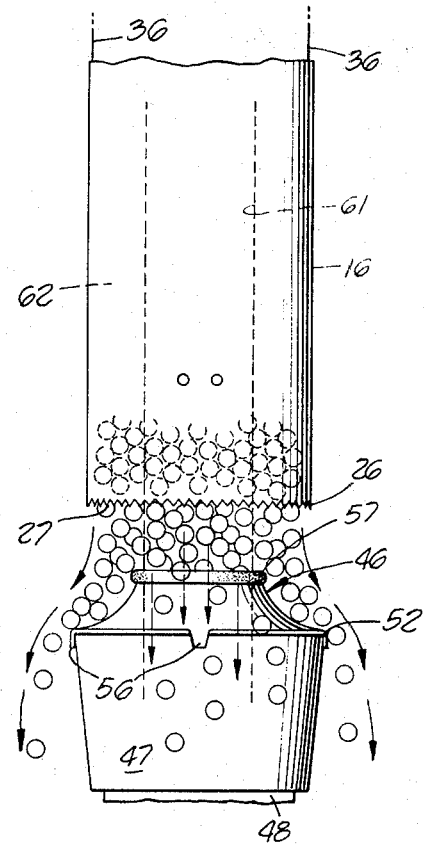
FIG. 4 is a side elevation somewhat like FIG. 2 showing the sampler in course of operation, various parts being broken away to reduce the size of the figure.

As particularly shown in FIG. 4, the falling tomatoes are destined for two paths. The tomatoes which come vertically within the ambit or confines or the opening 54 and within the inner edge 53 form substantially a core 61 of circular cylindrical configuration and of completely intact and uncut material. This core falls straight downwardly through the opening 54 into the container 47. The annular portion 62 of the column around the central core 61 may contain a number of cut and otherwise unrepresentative examples of the tomatoes. In descending, this outer, annular portion of the column falls outside of the edge 53 and is deflected by the separator 46 to fall outwardly and downwardly away from the container 47. This material can, in some instances, be permitted to fall back into the lading 6. In order that the rejected material be not too widely scattered, there is sometimes utilized a guard cone 63, as shown in FIG. 2, to catch any otherwise wandering material and direct it primarily downwardly.

Following this operation, the container 47 has in it nothing but a representative sample of intact tomatoes and can be moved into an out of the way position shown in FIG. 1. Thereupon, or before that if the separator is mounted to swing, the separator 46 can be lifted off the container 47 and the container passed to the inspector. Following that cycle of operation, the forklift truck 9 can be moved into a different location over the load, the tube 16 can descend again as before and can discharge a newly cut sample into the same container 47 or a similar container 47 cooperating with the separator 46. By repeating this operation as many times as needed, an accurate and adequate sample of the load can be taken. As indicated above, while some of the tomatoes are cut in this operation they are not otherwise harmed and may still have value. The cutting is not presently any great detriment since the commercial value of the amount of tomatoes is virtually nil alongside the other values involved. Should conditions change and should it become necessary to salvage cut tomatoes or other fruits or vegetables, they can readily be retained and used for making paste, jams, jellies, pie filling, soup and stew ingredients and the like.

It can be appreciated from the foregoing that the method involved includes cutting a columnar body from the main mass of material to be sampled, retaining the cut body for the time being while it is being withdrawn from the body being sampled, then releasing the columnar material in a generally vertical direction, the central portion or core of which falls into a separating and sampling mechanism while the peripheral, perhaps cut material falls away therefrom.

In actual practice, the present arrangement has been found to be a quick, simple, accurate and effective sampling device and method applicable to various different fruits and vegetables.

What is claimed is:

1. A sampler for fruits or vegetables in bulk comprising a tube having a tube axis and having a leading end spaced from said tube axis a predetermined distance, a gate, means for mounting said gate on said tube for movement between a first position blocking said leading end and a second position away from said leading end, means for moving said gate between said first position and said second position, a separator having a separator axis and having an outer edge spaced more than said predetermined distance from said separator axis and an inner edge spaced less than said predetermined distance from said separator axis, and means for disposing said tube with the tube axis substantially vertical and said leading end down and for holding said separator in a position spaced below said leading end and with said separator axis substantially aligned with said tube axis.

2. A sampler as in claim 1 in which said leading end includes a cutting edge.

3. A sampler as in claim 1 in which said moving means includes a flexible strap connected to said gate and extending along said tube.

4. A sampler as in claim 1 in which said separator is approximately a truncated cone symmetrical about said separator axis and disposed with the base of the cone down.

5. A sampler as in claim 1 including a cushion on and extending around said inner edge.

6. A sampler as in claim including means for positioning said separator on a container.

7. A sampler as in claim 1 and for use with a body of fruits or vegetables in bulk including means for positioning said tube axis over any of several chosen areas of said body.

8. A sampler as in claim 1 including a frame, and means for vertically translating said tube on said frame.

9. A sampler as in claim 8 including means for mounting said gate moving means for vertical translation with said tube.

10. A sampler as in claim 1 in which said tube is a circular cylinder symmetrical with said tube axis and said separator is an annulus symmetrical with said separator axis and defined by said outer edge and said inner edge.

11. A sampler as in claim 10 in which said gate is an arcuate band having two ends, and pivots mount said ends on the inside of said cylinder approximately on a diameter thereof.

12. A sampler as in claim 11 in which there are two of said gates symmetrical with respect to said diameter.

13. A method of sampling fruits or vegetables in a bulk body comprising cutting a columnar mass from said body, vertically separating said columnar mass from said body, and separating a columnar core from said columnar mass. columnar therefrom.

14. A method as in claim 13 in which said columnar mass includes a core of intact fruits or vegetables and cut fruits or vegetables around the periphery thereof and said cut fruits or vegetables are discarded upon separating said columnar core therefrom.

15. A method of sampling fruits or vegetables in a bulk body comprising first cutting a discrete mass of individual fruits or vegetables from said bulk body thereby cutting some individual fruits or vegetables and leaving intact other individual fruits or vegetables, then separating said cut fruits or vegetables from said intact fruits or vegetables, and then using only said intact fruits or vegetables as a sample of said bulk body.

* * * * *